May 7, 1957
H. FRIEDMAN ET AL
2,791,712
PHOTOMULTIPLIER TUBE WITH SPECTRAL SENSITIVITY
LIMITED TO THE ULTRAVIOLET
Filed Jan. 18, 1955
2 Sheets-Sheet 1
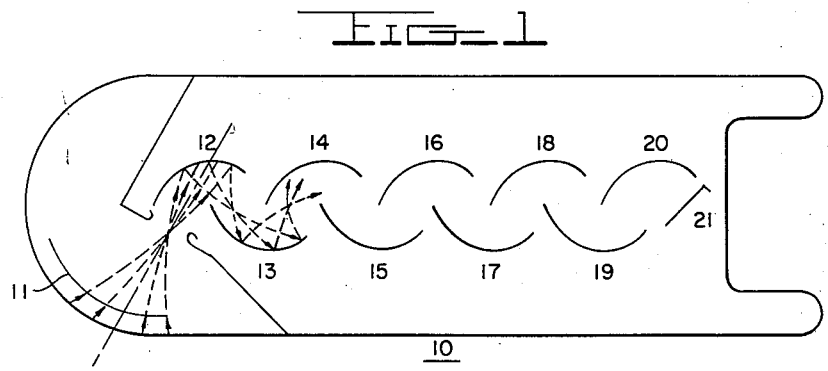
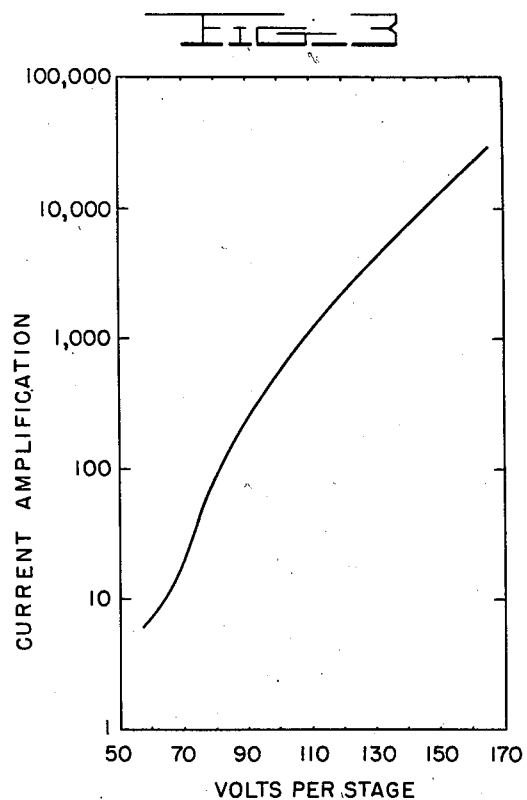
INVENTORS
HERBERT FRIEDMAN
LAWRENCE DUNKELMAN
BY *Wilson R. Maltby*
*Howard White*
ATTORNEYS

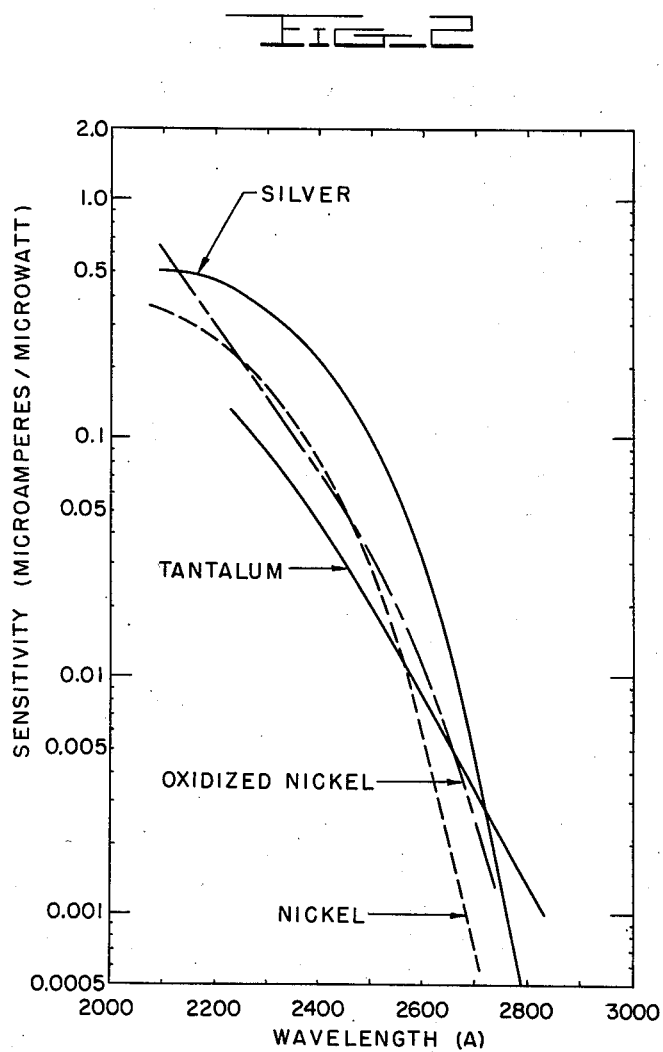

United States Patent Office 2,791,712
Patented May 7, 1957

2,791,712

PHOTOMULTIPLIER TUBE WITH SPECTRAL SENSITIVITY LIMITED TO THE ULTRAVIOLET

Herbert Friedman, Arlington, Va., and Lawrence Dunkelman, Chillum, Md.

Application January 18, 1955, Serial No. 482,687

8 Claims. (Cl. 313—95)

(Granted under Title 35, U. S. Code (1952), sec. 266)

The invention described herein may be manufactured and used by or for the Government of the United States of America for governmental purposes without the payment of any royalties thereon or therefor.

The present invention relates to a photomultiplier tube of the electrostatic type and more particularly to a photomultiplier tube which is a permanent type, having a high speed of response, good stability, and insensitive to light of wavelengths longer than 2850 Angstroms.

In the past, photon counters and simple vacuum photocells have been developed which would operate in the ultraviolet and above, and are sensitive to visible light, but due to the fact that they contain alkali metals the tubes are unstable, sensitive to temperature variations, and have a short life often requiring storage in darkness to restore their usefulness after only limited operation. Constant use causes fatigue, characterized by a decrease in sensitivity. Sometimes after storage the sensitivity is regained but often recovery is incomplete; therefore, the photomultiplier of the present invention is more rugged than past known tubes and has a permanent life.

The photocathode and dynodes of the present invention have surfaces that are insensitive to light above 2850 Angstroms. The photocathode is made of a non-alkali metal wherein the preferred photocathodes of the present invention are made of nickel, silver, tantalum, and oxidized nickel but photocathodes may be made of other metals from a group comprising aluminum, arsenic, bismuth, beryllium, cadmium, chromium, cobalt, copper, gallium, germanium, gold, iron, molybdenum, nickel, platinum, rhodium, silver, tantalum, tin, tungsten, zinc, alloys of these metals and their oxides. It has been determined that photocathodes made of nickel, silver, tantalum and oxidized nickel give the best results in response, stability and sensitivity wherein a graph showing their relative sensitivity is shown in Fig. 2. These photocathodes are photoemissive for light wavelengths in the ultraviolet and insensitive to wavelengths above 2850 Angstroms. The dynodes of the present invention are made of metals or alloys, for example silver-magnesium which is insensitive to light wavelengths above 2850 Angstroms. Any light of wavelengths above 2850 Angstroms that strikes the dynodes will not affect the dynode nor will the light cause emission of electrons therefrom. This is an important feature of the present invention which makes the present tube superior to other tubes. The improvements being the combination of a photocathode and dynode structure which is photoelectrically insensitive to light above 2850 Angstroms in wavelength, yet provides a secondary emission factor of 2 or more for electrons accelerated by approximately 167 volts per stage, which provides a photosensitive tube with the desired response.

The tube of the present invention is of permanent type, having much longer life than prior tubes. The present tube has a high frequency response, it is stable over wide temperature ranges, has very little fatigue, and is selectively sensitive to invisible light.

The combination of a photosurface with threshold below 2850 Angstroms and a dynode structure of a metal or alloy such as silver-magnesium which is photoelectrically insensitive to light above 2850 Angstroms provides a photosensitive tube with a high speed of response and good stability with strong response below the sunlight cut-off wavelength and sufficient internal amplification so that simple, stable, portable electronic indication may be employed. The conventional photo tubes do not lend themselves to this because they are strongly photoemissive in sunlight.

It is accordingly an object of the present invention to provide a photomultiplier tube with spectral sensitivity limited to ultraviolet light below 2850 Angstroms and insensitive to light wavelengths longer than 2850 Angstroms in wavelength.

Another object of the present invention is to provide a photomultiplier tube that is rugged and has permanent life.

Still another object of the present invention is to provide a photomultiplier tube comprising a cathode and dynode structure which is photoelectrically insensitive to light above 2850 Angstroms in wavelength yet provides a high secondary emission factor.

A further object of the present invention is to provide a photomultiplier tube that has a high speed of response and good stability with a greater gain than other known phototubes.

Other and more specific objects of this invention will become apparent upon careful consideration of the following detailed description when taken together with the accompanying drawings in which;

Fig. 1 illustrates an embodiment representing the structure of a photomultiplier of the electrostatic type, Fig. 2 is a spectral-sensitivity characteristic of a photomultiplier graphically illustrating the sensitivity (microamperes/microwatt) vs. the wavelength of the preferred photocathode, and Fig. 3 is a graph illustrating the current amplification characteristic of a tube with oxidized nickel as the photocathode.

Referring now to the drawings, there is shown in Fig. 1 a diagrammatic illustration of a photomultiplier tube 10 having a primary electron emitting photocathode 11, nine silver-magnesium secondary electron-emitting dynodes 12–20, and an anode 21, all of which are enclosed by a Corning 9741 high-silica glass envelope. For purposes of simplifying the illustration the common electrode supporting members have been omitted.

The photocathode 11 is made of a non-alkali metal, wherein the preferred metals are nickel, oxidized nickel, silver and tantalum. It can be a thin film wherein the incident light will shine through the film causing electrons to be emitted, it can be painted on the surface of the envelope, it can be a strip in any position wherein the light will be incident on the surface and the emitted electrons will be directed toward the first dynode. The photocathode of Fig. 1 is shown as a thin film. The metal used must be photoemissive but sensitive only to light of wavelengths less than 2850 Angstroms. The anode and envelope can be of any well known material in the art, as long as the envelope is made of material that will transmit wavelengths in the ultraviolet range. The envelope may also be made with a window made of calcium fluoride or lithium fluoride without departing from the invention.

The photocathode, dynodes and anode are positioned in such a manner that the emissive electrons from the photocathode will be electrostatically drawn from the cathode to the first dynode and successively attracted to each dynode and then to the anode. Each dynode has approximately the same relative successively higher positive potential difference, and functions better when the successive higher potential difference varies by a few volts from a constant potential difference.

The present photomultiplier tube is a vacuum cell in which amplification is achieved by utilizing the effect of secondary electron emission, that is, the electron emission from the electrode which is subject to electron bombardment. Photoelectrons are emitted by the photocathode 11, directed towards the secondary electron-emitting dynode 12 which is maintained at a positive potential with respect to the photocathode. The secondary electrons emitted by the dynode 12 are directed toward the next secondary electron-emitting dynode 13, then successively to each of the dynodes and finally to the anode 21, which is the collector. Each of the dynode targets as well as the anode must be at a relative successively higher positive potential with respect to the preceding target and at approximately the same relative potential difference.

For purposes of illustration, the sensitivity of tubes of the present invention having photocathodes made of nickel, tantalum, silver and oxidized nickel, at a potential difference of 167 volts for each stage was measured as a function of wavelength. The data were placed on an absolute basis by calibrating the tube at a wavelength of 2537 Angstroms against a standard low pressure mercury arc. The spectral response, quantum yield, dark current, and gain for each tube is given in the following table:

| Photocathode | Quantum yield at 2537A., electrons per quantum | Sensitivity, Micro Amps. per Microwatt | Dark current at 167 volts per stage, Amperes | Current amplification at 167 volts per stage |
|---|---|---|---|---|
| Tantalum | $0.75 \times 10^{-5}$ | 0.015 | $1.8 \times 10^{-9}$ | 10,000 |
| Silver | $1.7 \times 10^{-5}$ | 0.068 | $2.0 \times 10^{-9}$ | 20,000 |
| Oxidized Ni | $0.43 \times 10^{-5}$ | 0.023 | $3.7 \times 10^{-9}$ | 27,000 |
| Nickel | $0.60 \times 10^{-5}$ | 0.019 | $4.5 \times 10^{-9}$ | 16,000 |

The relative sensitivity of the above tubes having different photocathodes and a nine stage silver-magnesium dynode structure is shown by the graph in Fig. 2 wherein the sensitivity (microamperes/microwatt) is plotted vs. the wavelength. As shown, the tubes are insensitive to wavelengths above 2850 Angstroms and more sensitive as the wavelengths get shorter.

The current amplification at 167 volts per stage for each of the tubes ranges from 10,000 to 27,000 for the four tubes, this represents an average gain of 2.78 to 3.10 per stage. Fig. 3 illustrates the current amplification characteristic for the tube having an oxidized nickel photocathode.

The principle of the multistage secondary emissive multiplier tube is such that incident light below 2850 Angstroms strikes the photocathode 11 to accelerate electrons from the photocathode to the secondary electron emitting dynode 12 which ejects R (the yield factor) times as many secondary electrons. The yield factor being the ratio of the current of secondary electrons emitted by the surface to the incident primary electron current. These secondary electrons are in turn accelerated to the next dynode 13, ejecting from it $R^2$ as many secondary electrons as originally left the cathode, provided that none of the electrons have been lost along the way. After $n$ such secondary electron multiplications at $n$ successive dynodes, a yield factor of $R^n$ reaches the anode. Successful operation of the tube of this type is due to secondary electrons from one target reaching the next without any appreciable loss and that the electrons wherever incident meet a retarding field which will draw the new secondary electrons away from the prior dynode and toward the next dynode. Since the dynodes have a relative successively higher positive potential per stage the electrons will be attracted from one dynode to the next.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. A photomultiplier tube comprising a photocathode formed of a metal which is photoemissive to light of wavelengths of up to about 2850 Angstroms but non-photoemissive to light of wavelengths of above about 2850 Angstroms and a multi-stage dynode formed of a metal which is non-photoemissive to light of wavelengths above about 2850 Angstroms.

2. A photomultiplier tube as defined in claim 1, wherein the cathode is formed of metal selected from the group consisting of nickel, silver, tantalum and oxidized nickel.

3. A photomultiplier tube as defined in claim 1, where the cathode is formed of silver.

4. A photomultiplier tube as defined in claim 3, wherein the multi-stage dynode is formed of a silver-magnesium alloy.

5. A photomultiplier tube as defined in claim 1, wherein the cathode is formed of nickel.

6. A photomultiplier tube as defined in claim 1, wherein the cathode is formed of tantalum.

7. A photomultiplier tube as defined in claim 1, wherein the cathode is formed of oxidized nickel.

8. A photomultiplier tube as defined in claim 1, wherein the multi-stage dynode is formed of a silver-magnesium alloy.

References Cited in the file of this patent

UNITED STATES PATENTS 2,019,634    Rentschler    Nov. 5, 1935

OTHER REFERENCES

Rodda: "Photo-Electric Multipliers," 1953, page 26. Macdonald and Co., Ltd., London. TK7872E5R6.